(12) United States Patent
Wang et al.

(10) Patent No.: US 11,995,358 B2
(45) Date of Patent: May 28, 2024

(54) METHOD, DEVICE AND COMPUTER PROGRAM PRODUCT FOR MANAGING EXTENT IN STORAGE SYSTEM

(71) Applicant: EMC IP Holding Company LLC, Hopkinton, MA (US)

(72) Inventors: Sheng Wang, Beijing (CN); Huan Chen, Beijing (CN); Dapeng Chi, Beijing (CN); Wenyang Liu, Beijing (CN); Ying Tian, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 55 days.

(21) Appl. No.: 17/826,396

(22) Filed: May 27, 2022

(65) Prior Publication Data

US 2023/0132242 A1 Apr. 27, 2023

(30) Foreign Application Priority Data

Oct. 21, 2021 (CN) .......................... 202111228595.2

(51) Int. Cl.
*G06F 3/06* (2006.01)
(52) U.S. Cl.
CPC .......... *G06F 3/0689* (2013.01); *G06F 3/0619* (2013.01); *G06F 3/0631* (2013.01); *G06F 3/065* (2013.01)
(58) Field of Classification Search
CPC .... G06F 3/0689; G06F 3/0619; G06F 3/0631; G06F 3/065; G06F 3/0605; G06F 3/064; G06F 3/067; G06F 11/07
See application file for complete search history.

(56) References Cited

U.S. PATENT DOCUMENTS

| | | | |
|---|---|---|---|
| 6,976,187 B2 | 12/2005 | Arnott et al. | |
| 7,111,117 B2 | 9/2006 | Franklin et al. | |
| 10,481,802 B1* | 11/2019 | Gao | G06F 3/0659 |
| 10,635,344 B2 | 4/2020 | Agombar et al. | |
| 11,340,789 B2 | 5/2022 | Hua et al. | |
| 2011/0167215 A1* | 7/2011 | Eguchi | G06F 11/1076 |
| | | | 711/E12.001 |
| 2018/0188964 A1* | 7/2018 | Resch | G06F 3/067 |
| 2020/0026647 A1* | 1/2020 | Li | G06F 12/0804 |
| 2021/0055872 A1* | 2/2021 | Epping | G06F 3/0655 |
| 2022/0043709 A1* | 2/2022 | O'Rourke | G06F 11/2094 |

* cited by examiner

*Primary Examiner* — Jason W Blust
(74) *Attorney, Agent, or Firm* — BainwoodHuang

(57) ABSTRACT

Techniques manage extents in a storage system having storage devices supporting a redundant storage strategy. A reserved area of the storage system is generated based on a set of first-type reserved extents respectively located in the storage devices, and the set of first-type reserved extents supports a reconstruction operation for a failed storage device when the failed storage device appears in the storage devices. A data area is generated based on a set of data extents respectively located outside the reserved area in the storage devices, and the data area provides data storage for a user. Here, a reserved extent size of the set of first-type reserved extents is smaller than a data extent size of data extents in the data area of the set of data extents. The quantity of extents can be reduced, thereby reducing overhead of storage and computing resources involved by associated metadata.

20 Claims, 9 Drawing Sheets

METHOD, DEVICE AND COMPUTER PROGRAM PRODUCT FOR MANAGING EXTENT IN STORAGE SYSTEM

CROSS-REFERENCE TO RELATED APPLICATION

This application claims priority to Chinese Patent Application No. CN202111228595.2, on file at the China National Intellectual Property Administration (CNIPA), having a filing date of Oct. 21, 2021 and having "METHOD, DEVICE AND COMPUTER PROGRAM PRODUCT FOR MANAGING EXTENT IN STORAGE SYSTEM" as a title, the contents and teachings of which are herein incorporated by reference in their entirety.

TECHNICAL FIELD

Various implementations of the present disclosure relate to storage systems, and more particularly, to a method, a device, and a computer program product for managing extents in a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on a redundant array of independent disks (RAID) have been developed to improve data reliability. When one or more disks in a storage system fail, data in the failed disks can be reconstructed from data on other normally operating disks.

Mapped RAID has been developed at present. In this mapped RAID, disk is a logical concept and may include a plurality of extents. A plurality of extents included in a logical disk can be distributed on different physical storage devices in a resource pool of a storage system. For a plurality of extents in a stripe of the mapped RAID, the plurality of extents should be distributed on different physical storage devices. This makes it possible to perform, when a physical storage device where one of the plurality of extents is located fails, a reconstruction operation to recover data from physical storage devices where other extents are located.

As the storage capacity of a storage device increases, the storage device may include increasingly more extents. At this time, the amount of metadata corresponding to each extent will also increase significantly. As a result, the storage and computing of metadata will consume a lot of resources. Therefore, it is expected that extents in a storage device can be divided in a more effective manner.

SUMMARY OF THE INVENTION

Therefore, it is expected to develop and implement a technical solution for managing extents in a storage system in a more effective manner. It is expected that the technical solution is compatible with existing storage systems, and by modifying various configurations of existing storage systems, extents in a storage system may be managed in a more effective manner.

According to a first aspect of the present disclosure, a method for managing extents in a storage system is provided. Here, the storage system includes a plurality of storage devices supporting a redundant storage strategy. In the method, a reserved area of the storage system may be generated based on a set of first-type reserved extents respectively located in the plurality of storage devices, and the set of first-type reserved extents is used for supporting a reconstruction operation for a failed storage device when the failed storage device appears in the plurality of storage devices. A data area of the storage system may be generated based on a set of data extents respectively located outside the reserved area in the plurality of storage devices, and the data area is used for providing data storage for a user of the storage system, wherein a reserved extent size of the set of first-type reserved extents is smaller than a data extent size of data extents in the data area of the set of data extents.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided. The computer program product is tangibly stored on a non-transitory computer-readable medium and including machine-executable instructions for performing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated here by way of examples rather than limitation. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless otherwise stated, the term "or" means "and/or." The term "based on" denotes "at least partially based on." The terms "one example embodiment" and "one embodiment" mean "at least one example embodiment." The term "another implementation" means "at least one additional implementation." The terms "first," "second," and the like may refer to different or the same objects. Other explicit and implicit definitions may also be included below.

In the context of the present disclosure, a storage system may be a RAID-based storage system. The RAID-based storage system may combine a plurality of storage devices into one disk array. By providing redundant storage devices, the reliability of an entire disk group may greatly exceed that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

Figure 1A:
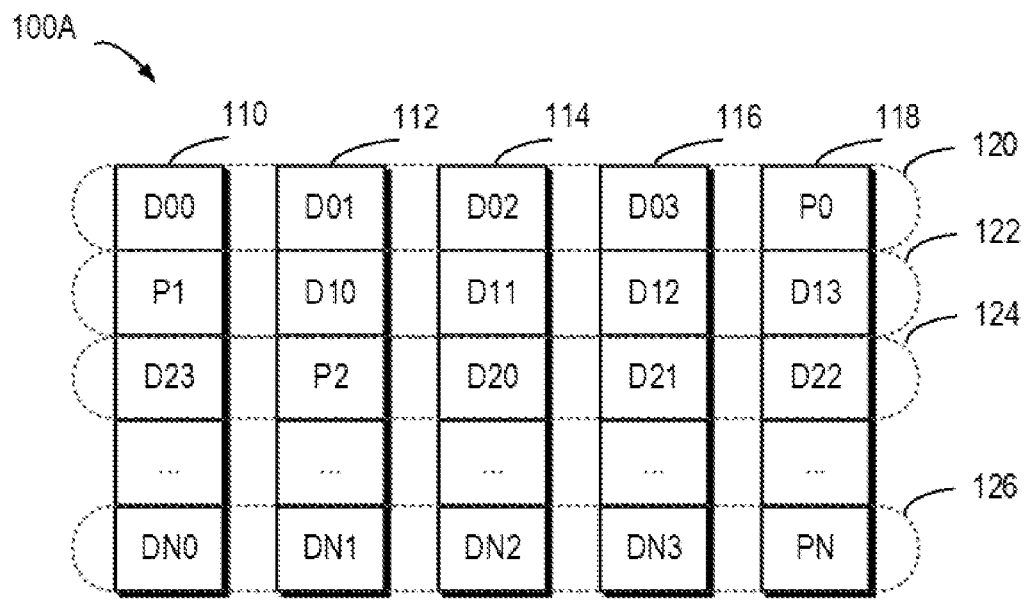
FIG. 1A and FIG. 1B respectively schematically show block diagrams of a storage system in which implementations of the present disclosure may be implemented.

FIG. 1A schematically shows a schematic diagram of storage system 100A in which a method of the present disclosure may be implemented. In the storage system shown in FIG. 1A, a RAID-5 (4D+1P, where 4D represents that a storage system includes four storage devices for storing data, and 1P represents that the storage system includes one storage device for storing a P parity) array including five independent storage devices (110, 112, 114, 116, and 118) is used as an example to illustrate the working principle of RAID. It should be noted that although five storage devices are schematically shown in FIG. 1A, more or fewer storage devices may also be included in other implementations depending on different RAID levels. Although stripes 120, 122, 124, . . . , 126 are shown in FIG. 1A, a RAID system may also include different numbers of stripes in other examples.

In RAID, a stripe may span a plurality of physical storage devices (e.g., stripe 120 spans storage devices 110, 112, 114, 116, and 118). Stripe may be simply understood as a storage area that satisfies a certain address range in the plurality of storage devices. Data stored in stripe 120 includes a plurality of parts: data extent D00 stored on storage device 110, data extent D01 stored on storage device 112, data extent D02 stored on storage device 114, data extent D03 stored on storage device 116, and data extent P0 stored on storage device 118. In this example, data extents D00, D01, D02, and D03 are stored data, while data extent P0 is the P parity of the stored data.

The manner in which data is stored in other stripes 122 and 124 is also similar to that for stripe 120, except that parities related to other data extents may be stored on a storage device different from storage device 118. In this way, when one of a plurality of storage devices 110, 112, 114, 116, and 118 fails, data in the failed device may be recovered from other normal storage devices.

Figure 1B:
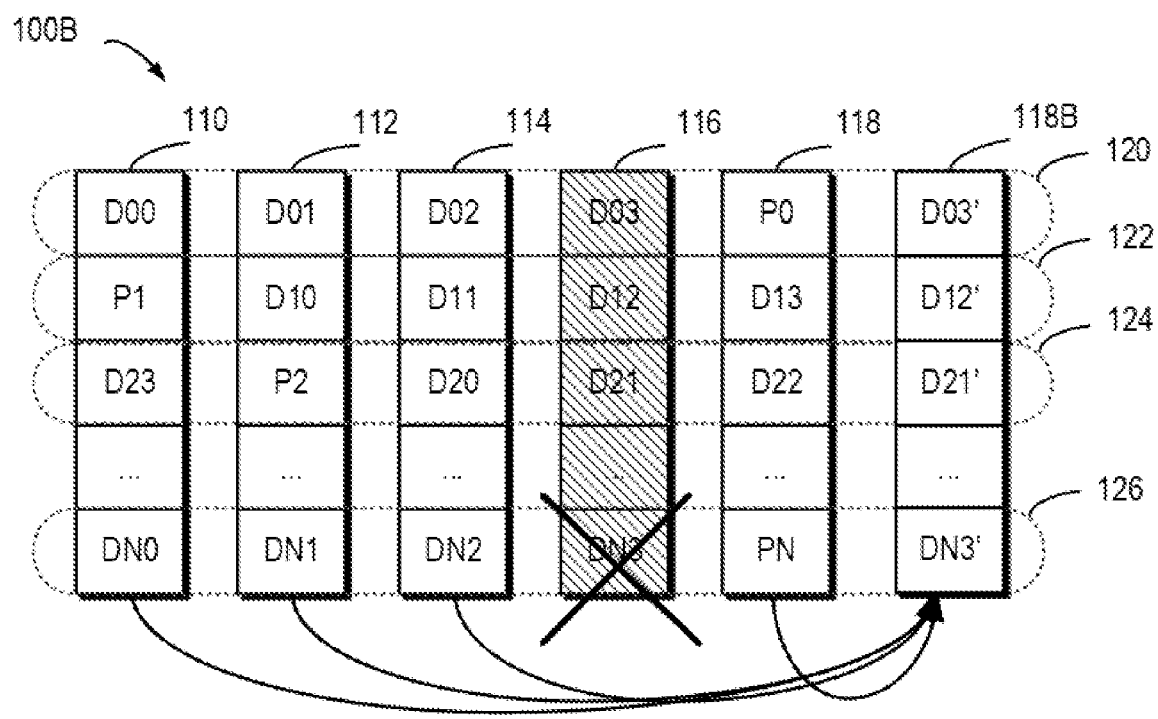

FIG. 1B schematically illustrates schematic diagram 100B of a reconstruction process of storage system 110A. As shown in FIG. 1B, when one storage device (for example, storage device 116 shown in shadow) fails, data may be recovered from multiple remaining storage devices 110, 112, 114, and 118 that operate normally. In this case, new backup storage device 118B may be added into RAID to replace storage device 118. In this way, the recovered data may be written to 118B and the system may be reconstructed.

It should be noted that although a RAID-5 storage system including 5 storage devices (wherein 4 storage devices (4D) are used for data storage and 1 storage device (1P) is used for parity storage) is described above with reference to FIGS. 1A and 1B, according to definitions of other RAID levels, there may also be storage systems that include other numbers of storage devices. For example, based on the definition of RAID-6, two storage devices may be used to store parities P and Q respectively. For another example, based on the definition of triple-parity RAID, three storage devices may be used to store parities P, Q, and R respectively.

Figure 2:
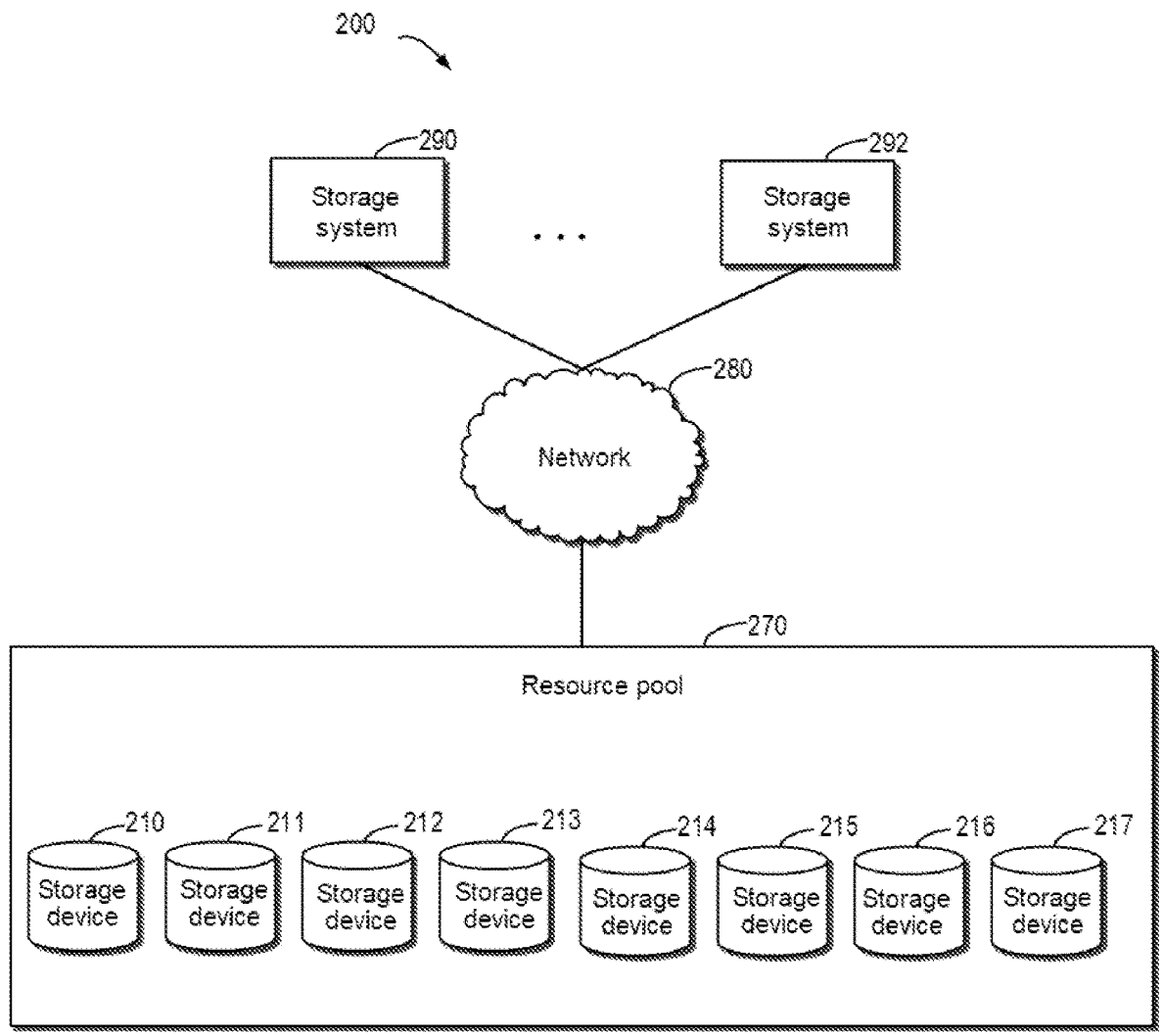
FIG. 2 schematically shows a block diagram of an example environment in which implementations of the present disclosure may be implemented.

With the development of distributed storage technologies, storage devices 110, 112, 114, 116, and 118 in the storage system shown in FIGS. 1A and 1B may no longer be limited to physical storage devices, but may be virtual storage devices. For example, extents on storage device 110 may respectively come from different physical storage devices (simply referred to as storage devices hereinafter) in a resource pool. FIG. 2 schematically illustrates a block diagram of an example environment in which a method of the present disclosure may be implemented. As shown in FIG. 2, storage resource pool 270 may include multiple physical storage devices 210, 211, 212, 213, 214, 215, 216, and 217. At this moment, storage spaces in the plurality of storage devices may be allocated to storage systems 290, . . . , 292 of a plurality of users. At this moment, storage systems 290, . . . , 292 of users may access the storage spaces in the storage devices in storage resource pool 270 via network 280. It will be understood that although FIG. 2 only schematically shows the case where storage resource pool 270 includes 8 storage devices, according to an example implementation of the present disclosure, storage resource pool 270 may also include more or fewer storage devices.

Figure 3:
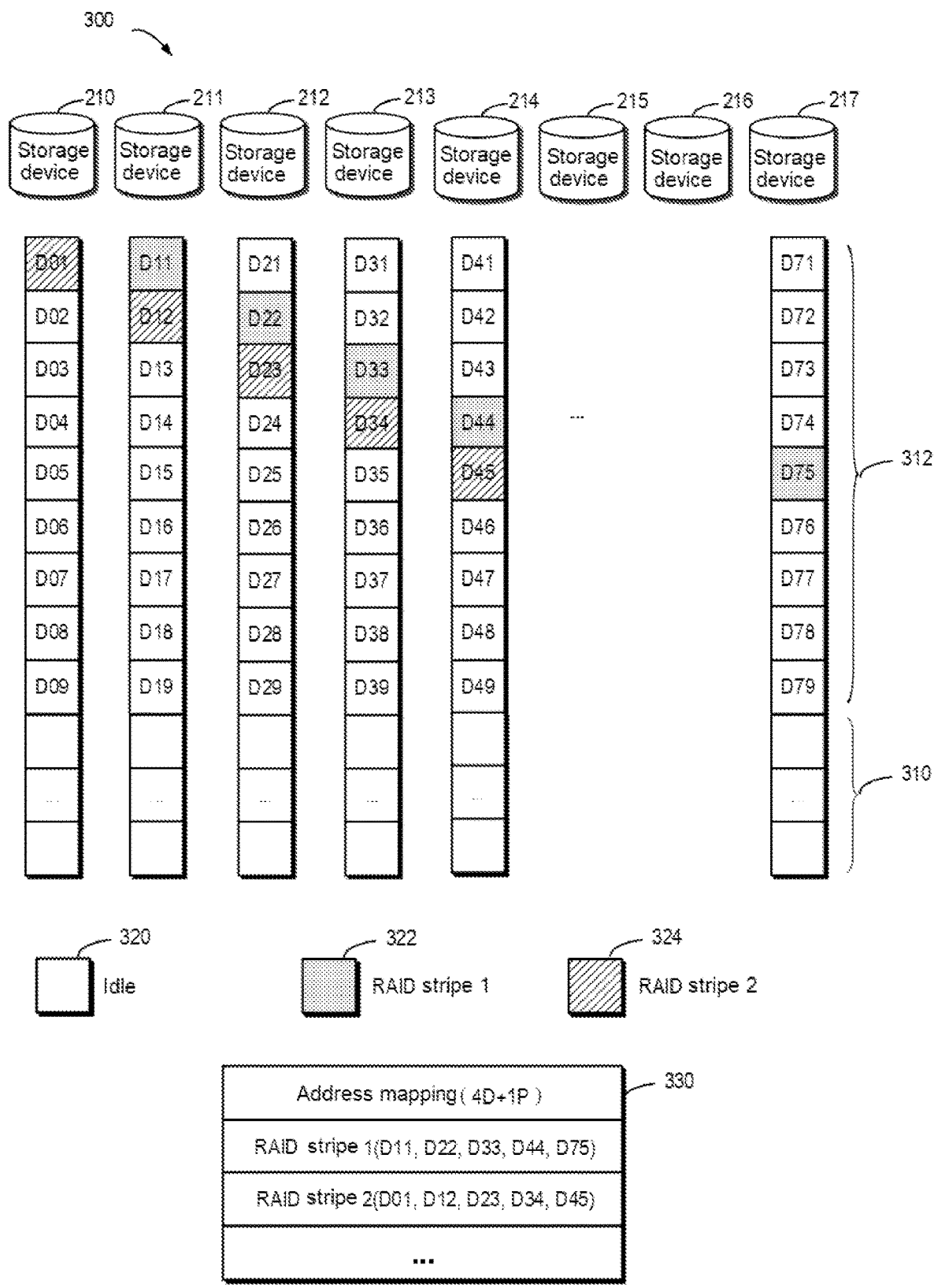
FIG. 3 schematically shows a diagram of a storage resource pool in FIG. 2.

FIG. 3 schematically shows a diagram of more information of storage resource pool 270 as shown in FIG. 2. Resource pool 270 may include multiple storage devices 210 to 217. Each storage device may include a plurality of extents (for example, a data extent located in data area 312 and a reserved extent located in reserved area 310), where legend 320 represents an idle extent, legend 322 represents an extent used for RAID stripe 1, and legend 324 represents an extent used for RAID stripe 2. At this moment, extents D11, D22, D33, and D44 for RAID stripe 1 are respectively used to store data extents of the stripe, and extent D75 is used to store a parity of data. Extents D01, D12, D23, and D34 for RAID stripe 2 are respectively used to store data extents of the stripe, and extent D45 is used to store a parity of data.

As shown in FIG. 3, address mapping 330 shows an association relationship between stripes and addresses where extents in the stripes are located. For example, RAID stripe 1 may include five extents: D11, D22, D33, D44, and D75, and the five extents are located in storage devices 211, 212, 213, 214, and 217 respectively. Specifically, as shown in FIG. 3, extent D11 is the first extent in storage device 211, and extent D22 is the second extent in storage device 212. As shown in FIG. 3, reserved area 310 may also exist in each storage device, so that when a storage device in the resource pool fails, extents in reserved area 310 in each storage device can be selected to reconstruct extents in the failed storage device.

It should be noted that FIG. 3 only uses a 4D+1P RAID-5 storage system as an example to show how the extents in the stripes are distributed in the plurality of storage systems in the resource pool. When other RAID levels are adopted, those skilled in the art can implement specific details based on the above principles. For example, in a 6D+1P+1Q storage system, eight extents in each stripe can be distributed across a plurality of storage devices.

With the development of hardware storage technology, capacities of storage devices are increasing, which makes each storage device include more extents (including two types, i.e., data extents and reserved extents). However, it is necessary to maintain metadata for each extent during the operation of the storage system, and the increase in the quantity of extents accordingly increases the amount of metadata. Further, the resource overhead related to the storage and computing of metadata is also greatly increased. At present, technical solutions for dividing storage devices into extents with larger sizes have been proposed. However, the increase in extent size makes it impossible to make full use of the storage space in each storage device.

Figure 4:
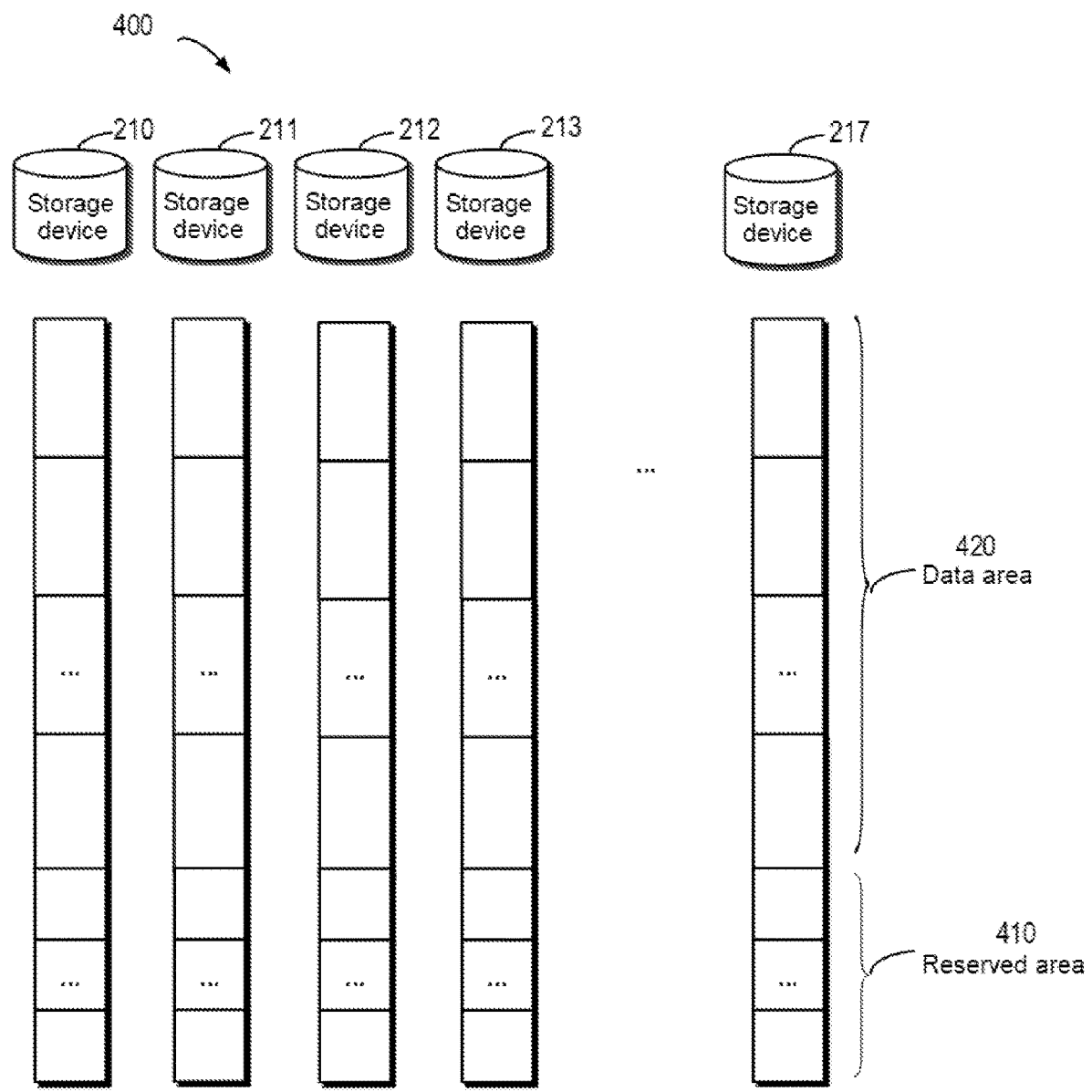
FIG. 4 schematically shows a block diagram of a storage system according to an example implementation of the present disclosure.

In order to solve at least some shortcomings in the technical solution described above, a method for managing extents in a storage system is provided according to an example implementation of the present disclosure. Hereinafter, an overview of an example implementation according to the present disclosure will be described with reference to FIG. 4. FIG. 4 schematically shows a block diagram of storage system 400 according to an example implementation of the present disclosure. As shown in FIG. 4, storage system 400 is proposed. Storage system 400 may include a plurality of storage devices 210, 211, 212, 213, . . . , and 217. It will be understood that the quantity of storage devices here is determined based on a redundant storage strategy supported by storage system 400. Assuming that storage system 400 is a storage system based on 4D+1P, then the minimum quantity of storage devices is 4+1=5. Considering the provision of reserved storage space, a reserved area of the storage system includes at least the capacity of one storage device. At this time, the minimum quantity of storage devices in the storage system is 5+1=6. Further, for the purpose of easy management, the maximum quantity of storage devices included in storage system 400 is usually set to 64 (or other numerical values).

In storage system 400, reserved area 410 and data area 420 may be provided. Here, in the case that the storage systems have the same capacity, the same quantity of reserved extents may be allocated in each storage device to generate reserved area 410, and the same quantity of data extents may be allocated in each storage device to generate data area 420. As shown in FIG. 4, the reserved extents in reserved area 410 and the extents in data area 420 may have different sizes. For example, the size of the reserved extent may be smaller than the size of the data extent.

Using the example implementation of the present disclosure, by setting different sizes for the reserved extent and the data extent, the data extent may be set to a larger value and the reserved extent may be set to a smaller value without losing existing performance of the storage system. At this time, each storage device may include a small total quantity of extents. By reducing the total quantity of extents, the total amount of metadata related to each extent may be reduced, thereby reducing various resource overheads related to the storage and computing of the metadata. Furthermore, setting extents of different sizes can be more beneficial to making full use of the storage space in each storage device.

Figure 5:
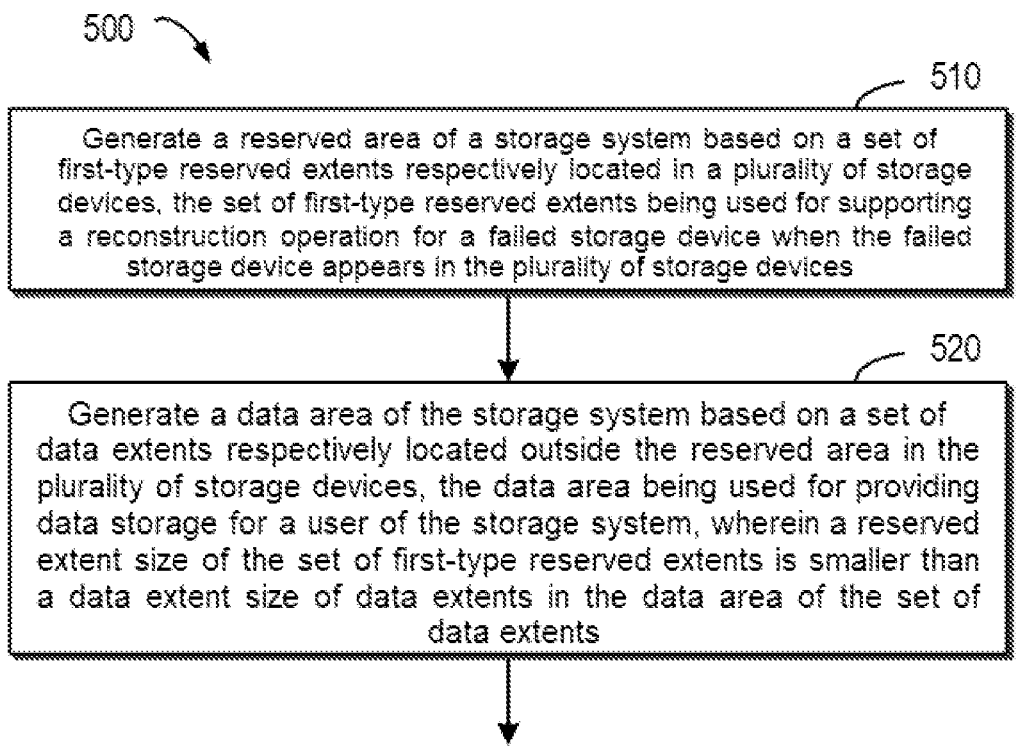
FIG. 5 schematically shows a flow chart of a method for managing a storage system according to an example implementation of the present disclosure.

More details of an example implementation of the present disclosure will be described below with reference to FIG. 5. FIG. 5 schematically shows a flow chart of method 500 for managing extents in a storage system according to an example implementation of the present disclosure. At block 510, reserved area 410 of a storage system is generated based on a set of first-type reserved extents respectively located in a plurality of storage devices. Here, the set of first-type reserved extents is used for supporting a reconstruction operation for a failed storage device when the failed storage device appears in the plurality of storage devices. It will be understood that the reserved extent here may have a smaller size compared with the data extent. More details on generating reserved area 410 will be provided below.

It will be understood that the basic function of storage system 400 is supporting the data reconstruction operation of the failed storage device when the failed storage device appears in the plurality of storage devices. Therefore, the size and quantity of reserved extents in the storage system must meet basic requirements for data reconstruction. According to an example implementation of the present disclosure, the size of the reserved extent under different conditions may be considered. Assuming that the storage system includes n storage devices, then the reserved area will be provided by the n storage devices. Generally speaking, in a 4D+1P storage system, the total capacity of the reserved area is the capacity of one storage device. Assuming the capacity of the storage device is $Size_{disk}$, then the reserved capacity included by each storage device may be $Size_{disk}/(n-1)$.

In an extreme case where the storage system includes 64 (maximum quantity) storage devices, a reserved area for reconstruction operations will be provided by 64−1=63 storage devices. At this time, this extreme case involves the maximum size of the reserved extent. According to an example implementation of the present disclosure, in order to determine the maximum size of the first-type reserved extent, the maximum quantity of the plurality of storage devices corresponding to the redundant storage strategy can be determined, and further, the maximum size of the first-type reserved extent may be determined based on the maximum quantity and the capacity of the storage device.

Figure 6:
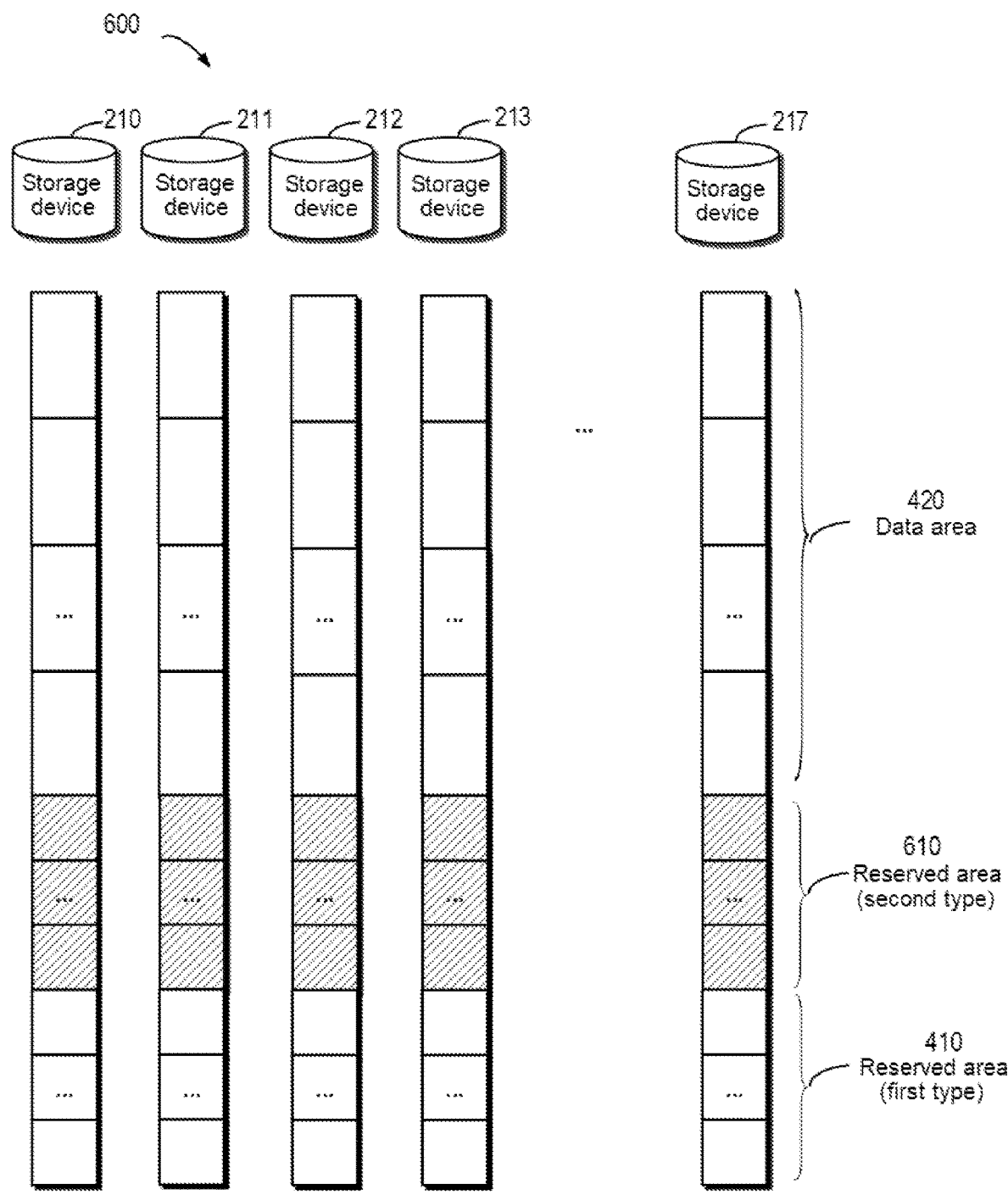
FIG. 6 schematically shows a block diagram of a storage system supporting expansion according to an example implementation of the present disclosure.

Hereinafter, determining the maximum size will be described by returning to FIG. 4. As shown in FIG. 6, assuming that the storage system includes 64 (maximum quantity) storage devices 210, 211, 212, 213, ..., and 217, and the maximum size of the reserved extent can be determined based on this extreme case. At this time, the reserved capacity provided by each storage device will be $Size_{disk}/(64-1)$. Specifically, the maximum size of the reserved extent can be determined based on the following Formula 1:

$$Size_{de\_small} <= Size_{disk}/(n_{max}-1)/m \quad \text{Formula 1}$$

where $Size_{de\_small}$ represents the maximum size of the first-type reserved extent, $Size_{disk}$ represents the maximum value of the capacity of the storage device, $n_{max}$ represents the maximum quantity of the plurality of storage devices included in the storage system, and m represents a positive integer. Using the example implementation of the present disclosure, the maximum size of the reserved extent can be quickly determined based on simple mathematical operations. It will be understood that Formula 1 only schematically shows an example for determining the maximum size. The maximum size can be determined when m=1, and m can be set to another value. For example, when m=2, a combination of two reserved extents can correspond to a reserved extent having the maximum size.

According to an example implementation of the present disclosure, after the maximum size of the reserved extent has been determined, the minimum quantity of the first-type reserved extents in each storage device may be further determined. In the context of the present disclosure, each storage device may include the same quantity of reserved extents. At this time, the minimum quantity of reserved extents included in each storage device may be determined based on a predetermined capacity of the reserved area and the maximum size of the first-type reserved extents. It will be understood that the minimum quantity here means that in order to support the failure reconstruction operation, the quantity of reserved extents included in each storage device must be greater than or equal to the minimum quantity; otherwise, the storage space in the reserved area will not be enough to store the reconstructed data.

It will be understood that when the size of the reserved extent has been determined, the minimum quantity of reserved extents in a storage device depends on the capacity of the reserved area of the storage system. That is, the minimum quantity should be greater than or equal to the quantity of extents on a failed driver. In an extreme case, the quantity is determined by the predetermined capacity of the reserved area (usually the capacity of a storage device) and the maximum size of the reserved extent. Since the above case is an extreme case, as long as the minimum quantity meets the extreme case, the total capacity of the reserved area generated in this way can meet the requirements for data reconstruction. In a 4D+1P storage system, at least 5 storage devices and 1 backup storage device are required. At this time, the minimum quantity of the first-type reserved extents included in each storage device can be determined based on the following Formula 2:

$$n_{de\_spare} >= \frac{m * \left(\frac{Size_{disk\_max}}{Size_{de\_small}}\right)}{Width_{raid}} \quad \text{Formula 2}$$

Wherein $n_{de\_spare}$ represents the minimum quantity of the first-type reserved extents used for supporting the reconstruction of faulty data, $Size_{disk\_max}$ represents the maximum capacity of the storage device, and $Size_{de\_small}$ represents the size of the first-type reserved extent (the size may be less than or equal to the maximum size of the reserved extent determined by Formula 1), and $Width_{raid}$ represents the width of the storage system (in this example, $Width_{raid}=4+1=5$).

After the maximum size of the first-type reserved extents and the minimum quantity of the reserved extents included in each storage device have been determined based on Formula 1 and Formula 2, respectively, based on the maximum size and minimum quantity, at least one first-type reserved extent may be determined from the storage device, for generating reserved area 410. With the example implementation of the present disclosure, the maximum size and minimum quantity determined based on the above formulas are only illustrative, and the above formulas represent the minimum requirements in extreme cases. When generating reserved area 410, the size of the reserved extent may be set to any value not greater than the maximum size (for example, half, ¼, or another ratio of the maximum size). Alternatively and/or additionally, the quantity of reserved extents in each storage device may be set to any value not lower than the minimum quantity.

Utilizing the example implementation of the present disclosure, first-type reserved area 410 generated based on the above-described manner can meet the basic requirements of faulty data reconstruction. In other words, when a faulty storage device appears in the storage system, the data in the faulty storage device may be reconstructed into reserved area 410 based on the principle of RAID. At this time, reserved area 410 will be sufficient to accommodate all the reconstructed data corresponding to the failed storage device. It will be understood that the above description only uses a 4D+1P storage system as an example to describe specific implementations. When the storage system adopts another redundant storage strategy (such as 6D+1P+1Q), the above Formula 1 and Formula 2 may be modified accordingly.

The basic requirements for using first-type reserved extents 410 to support the fault reconstruction operation have been described above. In the following, further requirements regarding the use of the reserved area to support storage system expansion will be described. It will be understood that as storage system 400 is used, the quantity of storage devices in storage system 400 may change. For example, when the available storage space in storage system 400 is insufficient, a backup storage device may be added to storage system 400 to expand the space of storage system 400. According to an example implementation of the present disclosure, the reserved area may include second-type reserved extents to support the expansion of the storage system. Hereinafter, more details related to expansion of the storage system will be described with reference to FIG. 6.

FIG. 6 schematically shows block diagram 600 of a storage system supporting expansion according to an example implementation of the present disclosure. As shown in FIG. 6, in addition to first-type reserved area 410, each storage system may also include second-type reserved area 610, and reserved area 610 may support an expansion operation in the storage system when the quantity of the plurality of storage devices changes. During the expansion process, more storage devices can be added to the storage system. The quantity of storage devices added here may be different. For example, one, two, or more storage devices may be added to the storage system.

In the following, more details about the expansion process will be described considering an extreme case where all storage devices in the storage system are "full." Assuming that a plurality of storage devices are added to the storage system at the same time and the quantity of the plurality of storage devices is greater than or equal to the RAID width, then the idle storage space in the newly added plurality of storage devices can be used directly without data migration to construct a strip that spans a plurality of storage devices. However, if the quantity of newly added storage devices is less than the RAID width, all idle extents are located in the newly added idle storage devices, and thus a stripe that spans a plurality of storage devices and meets the RAID width cannot be generated immediately. Before using the storage space in the idle storage devices, data needs to be migrated inside the storage system to form a strip that meets the RAID width requirements of the storage system. Hereinafter, more details about data migration in a reserved area will be described with reference to FIG. 7.

Figure 7:
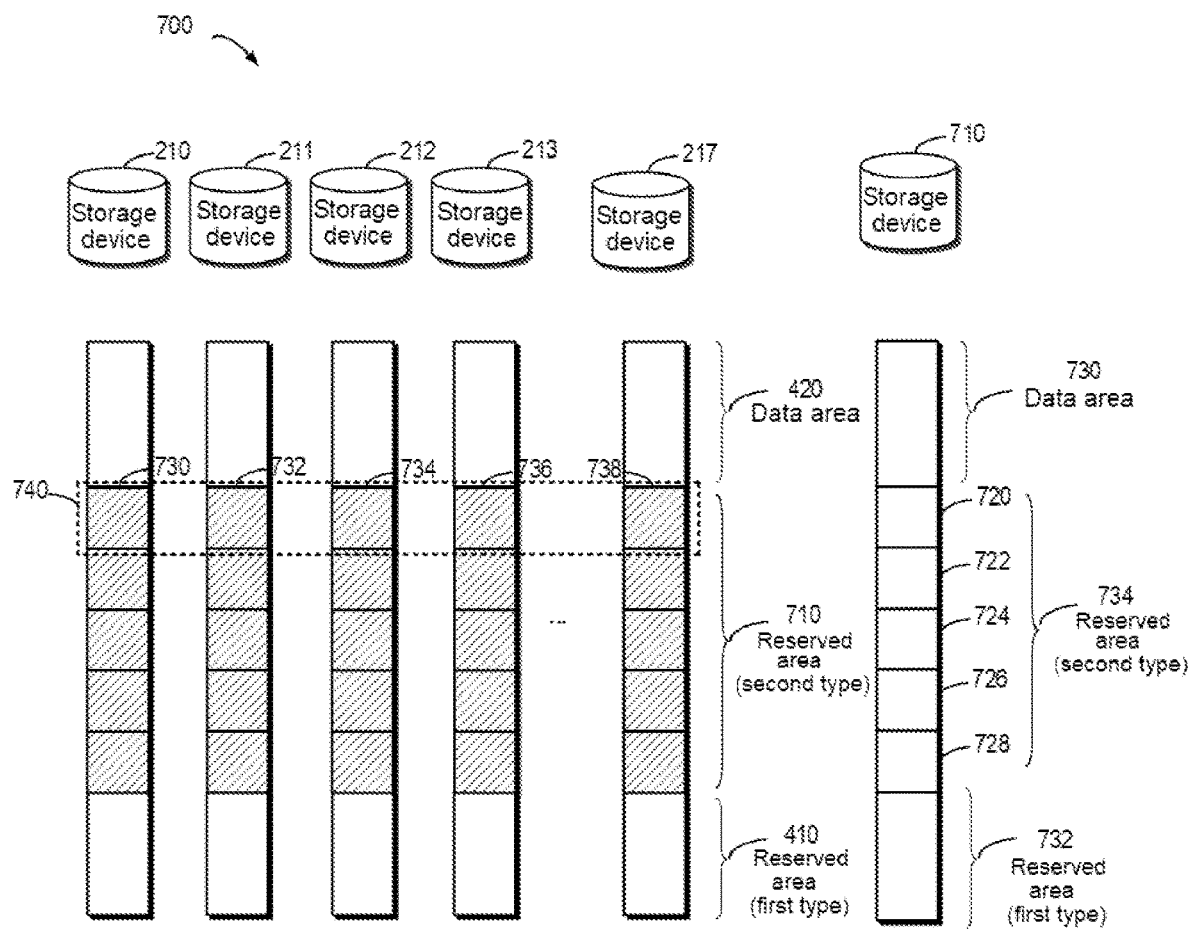
FIG. 7 schematically shows a block diagram of a reserved area in a storage system according to an example implementation of the present disclosure.

FIG. 7 schematically shows block diagram 700 of a reserved area in a storage system according to an example implementation of the present disclosure. Specifically, FIG. 7 schematically shows an extreme case of adding only one storage device 710 to the storage system. The storage system initially includes a plurality of storage devices 210, 211, 212, 213, . . . 217, and each storage device may include first-type reserved area 410, second-type reserved area 710, and data area 420. Idle storage device 710 can be added to the storage system, and the size of storage device 710 is the same as other storage devices.

It will be understood that the storage devices may have a similar structure, and similarly, storage device 710 may include first-type reserved area 732, second type of reserved area 734, and data area 730. After the expansion operation is performed, data area 420 and data area 730 are used together as the data area of the expanded storage system, reserved areas 710 and 734 are used together as the second-type reserved area of the expanded storage system, and reserved areas 410 and 732 are used together as the first-type reserved area of the expanded storage system.

After storage device 710 is added, all the idle space is located in storage device 710, so the data migration operation should be performed first to form a strip that meets the RAID width. Specifically, data in extents 730, 732, 734, 736, and 738 (respectively located in storage devices 210, 211, 212, 213, and 217) may be migrated to extents 720, 722, 724, 726, and 728 in reserved area 734, respectively to form idle strip 740 that spans five storage devices in the expanded storage system. As can be seen from FIG. 7, second-type reserved area 734 needs to include at least 5 extents (that is, the RAID width supported by the storage system) to accommodate data from the 5 migrated extents. In other words, the quantity of second-type reserved extents located in the storage device may be determined based on the minimum quantity (that is, the RAID width of the 4D+1P storage system) of the plurality of storage devices corresponding to the redundant storage strategy. Specifically, the quantity of extents included in second-type reserved area 734 may be determined based on the following Formula 3:

$$n_{de\_provisioning} \geq m * \text{Width}_{raid} \qquad \text{Formula 3}$$

where $n_{de\_provisioning}$ represents the quantity of second-type reserved extents used for supporting an expansion operation in a storage device, m represents a positive integer, and $\text{Width}_{raid}$ represents the RAID width supported by the redundant storage strategy of the storage system.

The extreme case of adding only one storage device 710 to the storage system has been described above. The extreme case relates to the worst case of data migration, and the minimum quantity of second-type reserved extents has been determined based on the worst case. In other cases than the extreme case (for example, 2 or more storage devices are added to the storage system), only a small amount of data migration is required, so the quantity of the second-type reserved extents involved will be smaller. Therefore, as long as the quantity of the second-type reserved extents in each storage device is greater than or equal to $n_{de\_provisioning}$, the requirements of the expansion operation of the storage system can be met.

According to an example implementation of the present disclosure, the second-type reserved extents may be set to have the same size as the first-type reserved extents. That is, the two types of reserved extents have the same size. At this time, the total quantity of reserved extents in each storage device may be determined based on the sum of the quantities of the two types of reserved extents. Specifically, the quantity of the reserved extents in each storage device may be determined based on the following Formula 4:

$$n_{de\_small} = n_{de\_spare} + n_{de\_provisioning} \qquad \text{Formula 4}$$

where $n_{de\_small}$ represents the quantity of reserved extents in a storage device, $n_{de\_spare}$ represents the quantity of first-type reserved extents in a storage device (for example, it can be determined based on Formula 2), and $n_{de\_provisioning}$ represents the quantity of the second-type reserved extents in a storage device (for example, it can be determined based on Formula 3). In this way, the problem of determining the quantity of reserved extents may be converted into a simple mathematical problem, so as to determine how many reserved extents to use to generate the reserved area.

The specific process of separately determining the first-type reserved area and the second-type reserved area in the storage system has been described above. Hereinafter, more details for determining the data area of the storage system will be described with reference to FIG. 7. Returning to FIG. 5, at block 520, data area 420 of the storage system is generated based on a set of data extents respectively located outside the reserved area in the plurality of storage devices, and data area 420 is used for providing data storage for users of the storage system. It will be understood that the data extent here may have a larger size. In other words, the reserved extent size of the reserved extent is smaller than the data extent size of the data extent in the data area.

According to an example implementation of the present disclosure, when data area 420 is generated, the minimum value of the data extent size may be determined based on a multiple of the maximum size of the reserved extent. Specifically, the minimum value of the data area size may be determined based on the following Formula 5:

$$\text{Size}_{de\_large} = m \times \text{Size}_{de\_small} \qquad \text{Formula 5}$$

where $\text{Size}_{de\_large}$ represents the size of the determined data extent, $\text{Size}_{de\_small}$ represents the minimum value of the size of the reserved extent (for example, determined based on Formula 1), and m represents a positive integer. With the example implementation of the present disclosure, the data extent and the reserved extent do not have to have the same size, but the size of the data extent may be set to a multiple of the reserved extent. For example, setting the size of the data extent to twice (or another multiple) of the size of the reserved extent can greatly reduce the quantity of data extents in each storage device (for example, the quantity may be reduced by half), thereby reducing the total quantity of extents, and thereby reducing the storage and computing resource overhead of metadata related to the extents.

According to an example implementation of the present disclosure, a predetermined condition associated with the quantity of data extents may be determined based on the minimum quantity of a plurality of storage devices corresponding to a storage strategy. Further, the quantity of data extents in each storage device in the plurality of storage devices may be determined based on the capacity of the storage device, the minimum value, and the predetermined condition. It will be understood that the total capacity of each storage device is equal to the sum of the capacity of the reserved area and the capacity of the data area. Therefore, the maximum size of the data extent is affected by the total capacity of the storage device and the capacity of the reserved area. Specifically, the maximum size of the data extent may be determined based on the following Formula 6.

$$Size_{de\_large} <= (Size_{disk} - Size_{de\_small} * n_{de\_small}) / n_{de\_large} \quad \text{Formula 6}$$

where $Size_{de\_large}$ represents the size of the data extent, $Size_{disk}$ represents the capacity of the storage device, $Size_{de\_small}$ represents the size of the reserved extent, $n_{de\_small}$ represents the quantity of reserved extents in the storage device, and $n_{de\_large}$ represents the quantity of data extents in the storage device. That is, the size of the data extent should meet the requirements of Formula 5 and Formula 6 at the same time. According to an example implementation of the present disclosure, the size of the data extent can be selected, and the size can meet the requirements of 5 and 6 at the same time.

Figure 8:
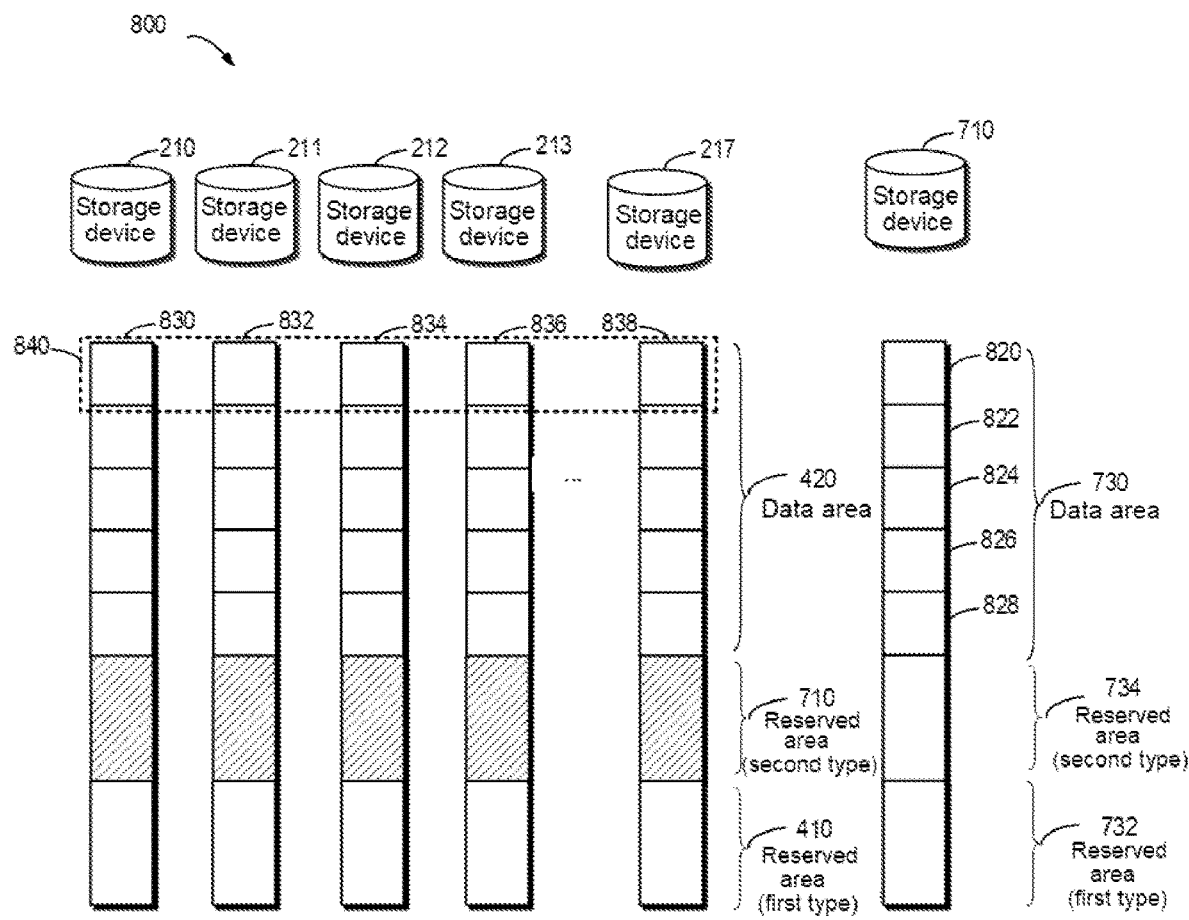
FIG. 8 schematically shows a block diagram of a data area in a storage system according to an example implementation of the present disclosure.

Further, the quantity of data extents located in the storage device in the plurality of storage devices may be determined based on the capacity of the storage device and the minimum value of the size of the data extent. Hereinafter, more details about generation of the data area will be described with reference to FIG. 8. FIG. 8 schematically shows block diagram 800 of a data area in a storage system according to an example implementation of the present disclosure. FIG. 8 shows more details of data area 730 in storage device 710. Still referring to the example in FIG. 7, assuming that storage devices 210, 211, 212, 213, ..., 217 are already "full," after storage device 710 is added to the storage system, only data area 730 of storage device 710 includes a plurality of idle extents 820, 822, 824, 826, and 828. Therefore, before using these idle extents, data in storage devices 210, 211, 212, 213, ..., 217 needs to be migrated to newly added storage device 710, and then a strip meeting the RAID width is formed in the expanded storage system.

Specifically, data in extents 830, 832, 834, 836, and 838 (located in storage devices 210, 211, 212, 213, and 217, respectively) may be migrated to extents 820, 822, 824, 826, and 828 in data extent 730, respectively, to form idle strip 840 that spans 5 storage devices in the storage system. As can be seen from FIG. 8, data area 730 needs to include at least 5 extents (that is, the RAID width supported by the storage system) to accommodate the data from the 5 migrated extents. In other words, the quantity of data extents located in each storage device may be determined based on the minimum quantity (that is, the RAID width of the 4D+1P storage system) of the plurality of storage devices corresponding to the redundant storage strategy. Specifically, the quantity of data extents included in data area 730 may be determined based on the following Formula 7:

$$n_{de\_large} \geq m * Width_{raid} \quad \text{Formula 7}$$

where $n_{de\_large}$ represents the quantity of data extents in the storage device, m represents a positive integer, and $Width_{raid}$ represents the RAID width supported by the redundant storage strategy of the storage system. In this way, the quantity of data extents in each storage device can be determined in a simple and effective manner. According to an example implementation of the present disclosure, the size of the data extent and the quantity of data extents included in each storage device can be determined based on Formula 5, Formula 6, and Formula 7. In this way, the generated data area can support the expansion requirements of the storage system, while ensuring that the quantity of data extents is as small as possible. In this way, the amount of metadata involved in the storage system and the corresponding storage and computing overhead can be reduced, and meanwhile, the utilization rate of each storage device can be improved.

It will be understood that the processes for generating the reserved area and the data area are described above only by taking a 4D+1P storage system as an example. According to an example implementation of the present disclosure, the method described above can also be applied in a storage system based on another redundant storage rule. For example, in a 6D+1P+1Q storage system, the RAID width will become 6+1+1=8, and those skilled in the art can modify various formulas accordingly based on the principles described above to apply them to the 6D+1P+1Q storage system.

It will be understood that the various storage devices in the above examples may have the same or different capacities. According to an example implementation of the present disclosure, the minimum capacity may be used as the capacity of each storage device, and the method described above can be applied. According to an example implementation of the present disclosure, in order to further fully utilize the storage space of each storage device, storage devices with different capacities may include different quantities of data extents. For example, a storage device with a smaller capacity may include fewer data extents, and a storage device with a larger capacity may include more data extents.

In the following, a storage system including 6 storage devices (each storage device has a capacity of 12 TB) will be taken as a specific example to describe the performing process of applying the method described above. When the reserved area and the data area are generated according to the existing technical scheme (the reserved extent and the data extent have the same size), each storage device may include 488 extents (including both the reserved extents and the data extents). At this time, the storage system will include 488*6=2928 extents. These extents will involve a large amount of metadata. When the quantity of storage devices in the storage system is larger (for example, hundreds or thousands), the amount of metadata will be more.

Method 500 described above may be applied to the above-mentioned storage system. Specifically, the size and quantity of reserved extents and the size and quantity of data extents may be determined based on the formulas described above. At this time, each storage device may include 216 extents (including 186 reserved extents and 30 data extents). Specifically, the size of the reserved extent may be set to not greater than 12*1024/(64−1)=195 GB)). At this time, any value among 195, 97, 48, and the like may be selected. Assuming that the size of the reserved extent is set to 97 GB, then each storage device includes at least 12*1024/5/97=26 first-type reserved extents. Further, in order to support the expansion operation of the storage system, each storage device may include 5 second-type reserved extents.

At this time, the remaining storage space in each storage device can be expressed as (12*1024−97*(26+5))/5=1856 GB. Therefore, the size of the data extent may be set to 1856, 928, 464, 232, ..., and the like. Further, the size of the data extent should be a multiple of the size of the reserved extent (i.e., 97 GB), so the value of 1843 GB, which is closest to the maximum size of the data extent of 1856 GB, can be selected as the size of the data extent. Although there is waste in the storage system, each storage device only includes 5 data extents at this time. The total quantity of all extents (including reserved extents and data extents) in the storage system is: (5+26+5)*6=216. Compared with the 2928 extents generated by the existing technical solution, the total quantity of extents can be reduced to 216 by using the example implementation of the present disclosure. At this time, the amount of metadata in the storage system will be greatly reduced. In this way, the overhead of storage resources and computing resources related to metadata can be reduced, thereby improving the overall performance of the storage system.

The examples of the method according to the present disclosure have been described in detail above with reference to the accompanying drawings, and the implementation of a corresponding apparatus will be described below. According to an example implementation of the present disclosure, an apparatus for managing extents in a storage system is provided. Here, the storage system includes a plurality of storage devices supporting a redundant storage strategy, and the apparatus includes: a reserved area generation module configured to generate a reserved area of the storage system based on a set of first-type reserved extents respectively located in the plurality of storage devices, the set of first-type reserved extents being used for supporting a reconstruction operation for a failed storage device when the failed storage device appears in the plurality of storage devices; and a data area generation module configured to generate a data area of the storage system based on a set of data extents respectively located outside the reserved area in the plurality of storage devices, the data area being used for providing data storage for a user of the storage system. According to an example implementation of the present disclosure, a reserved extent size of the set of first-type reserved extents is smaller than a data extent size of data extents in the data area of the set of data extents. According to an example implementation of the present disclosure, the apparatus further includes modules configured to execute other steps of method 500 described above.

Figure 9:
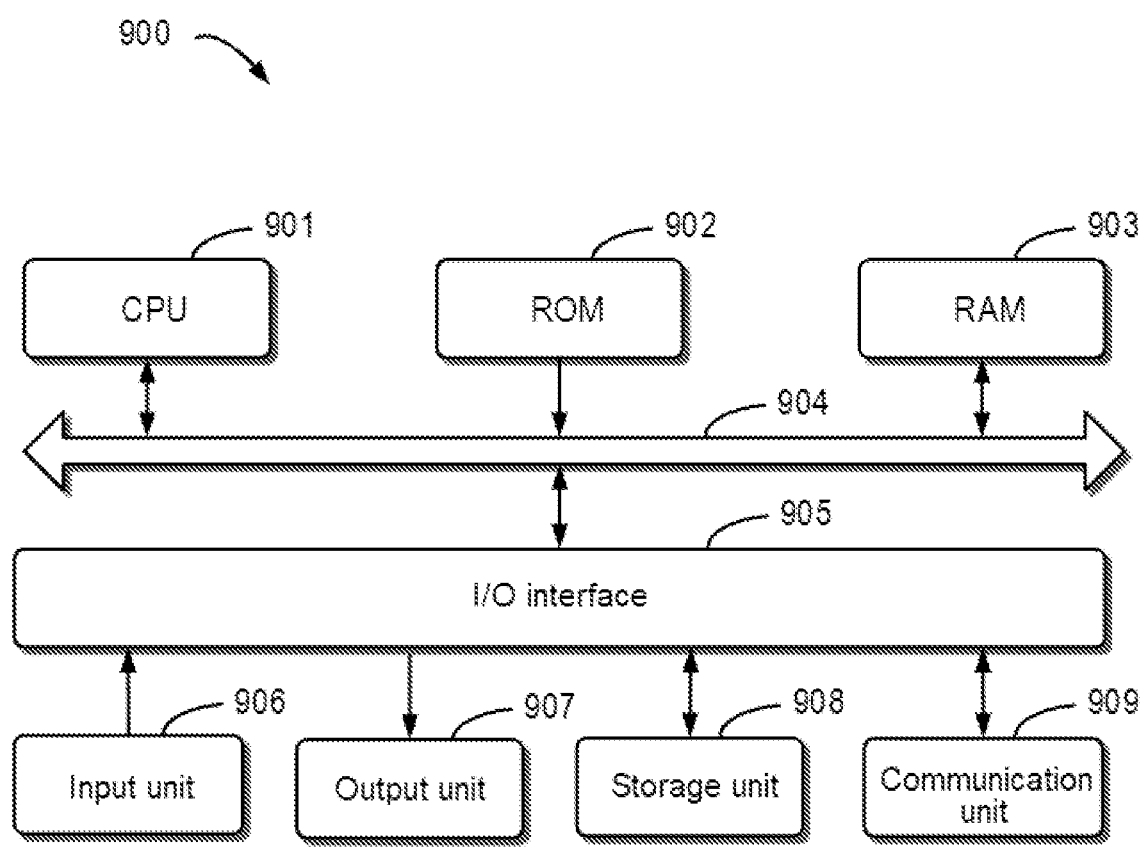
FIG. 9 schematically shows a block diagram of a device for managing a storage system according to an example implementation of the present disclosure.

FIG. 9 schematically shows a block diagram of device 900 for managing extents in a storage system according to an example implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, for example, method 500, may be performed by processing unit 901. For example, in some implementations, method 500 may be implemented as a computer software program that is tangibly included in a machine-readable medium, such as storage unit 908. In some implementations, part all or of the computer program may be loaded and/or installed onto device 900 via ROM 902 and/or communication unit 909. When the computer program is loaded into RAM 903 and executed by CPU 901, one or more steps of method 500 described above may be performed. Alternatively, in other implementations, CPU 901 may also be configured in any other suitable manner to implement the above processes/methods.

According to an example implementation of the present disclosure, an electronic device is provided, including: at least one processor; a volatile memory; and a memory coupled to the at least one processor, wherein the memory has instructions stored therein which, when executed by the at least one processor, cause the device to perform actions for managing extents in a storage system, the storage system including a plurality of storage devices supporting a redundant storage strategy. The actions include: generating a reserved area of the storage system based on a set of first-type reserved extents respectively located in the plurality of storage devices, the set of first-type reserved extents being used for supporting a reconstruction operation for a failed storage device when the failed storage device appears in the plurality of storage devices; and generating a data area of the storage system based on a set of data extents respectively located outside the reserved area in the plurality of storage devices, the data area being used for providing data storage for a user of the storage system, wherein a reserved extent size of the set of first-type reserved extents is smaller than a data extent size of data extents in the data area of the set of data extents.

According to an example implementation of the present disclosure, generating the reserved area includes: determining a maximum size of the first-type reserved extent; determining a minimum quantity of the first-type reserved extents in a storage device of the plurality of storage devices; and determining, based on the maximum size and the minimum quantity, at least one first-type reserved extent from the storage device for generating the reserved area.

According to an example implementation of the present disclosure, determining the maximum size includes: determining a maximum quantity of the plurality of storage devices corresponding to the redundant storage strategy; and determining the maximum size of the first-type reserved extent based on the maximum quantity and a capacity of the storage device.

According to an example implementation of the present disclosure, determining the minimum quantity includes: determining the minimum quantity based on a predetermined capacity of the reserved area and the maximum size of the first-type reserved extent.

According to an example implementation of the present disclosure, generating the reserved area further includes: generating the reserved area based on a set of second-type reserved extents respectively located in the plurality of storage devices, the set of second-type reserved extents being used for supporting an expansion operation in the storage system when the quantity of the plurality of storage devices changes.

According to an example implementation of the present disclosure, generating the reserved area based on the set of second-type reserved extents includes: determining, based on a minimum quantity of the plurality of storage devices corresponding to the storage strategy, the quantity of second-type reserved extents located in the storage devices.

According to an example implementation of the present disclosure, the second-type reserved extents and the first-type reserved extents have the same size, and generating the reserved area further includes: for the storage device, determining the quantity of reserved extents located in the storage device based on a sum of the minimum quantity of the first-type reserved extents and the quantity of the second-type reserved extents.

According to an example implementation of the present disclosure, generating the data area includes: determining a maximum value of the data extent size based on a multiple of the maximum size of the reserved extent; and based on a capacity of a storage device in the plurality of storage devices and the maximum value of the data extent size, determining a data extent quantity of data extents located in the storage device.

According to an example implementation of the present disclosure, determining the data extent quantity of the data extents located in the storage device further includes: determining a predetermined condition associated with the data extent quantity based on a minimum quantity of the plurality of storage devices corresponding to the storage strategy; and determining the data extent quantity based on the capacity of the storage device in the plurality of storage devices, the maximum value, and the predetermined condition.

According to an example implementation of the present disclosure, the predetermined condition includes that: the data extent quantity is an integer multiple of the minimum quantity of the plurality of storage devices corresponding to the storage strategy.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of block in the block diagrams and/or flow charts may be implemented by using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for managing extents in a storage system which comprises a plurality of storage devices supporting a redundant storage strategy, the method comprising:
    dividing each of the plurality of storage devices into a set of first-type reserved extents and a set of data extents, the data extents having a data extent size;
    generating a reserved area of the storage system based at least on the set of first-type reserved extents respectively located in the plurality of storage devices, the set of first-type reserved extents being used for supporting a reconstruction operation for a failed storage device when the failed storage device appears in the plurality of storage devices;
    generating a data area of the storage system based on the set of data extents respectively located outside the reserved area in the plurality of storage devices, the data area being used for providing data storage for a user of the storage system; and
    performing the reconstruction operation for the failed storage device, the performing of the reconstruction operation including selecting the first-type reserved extents in the reserved area having smaller reserved extent size than the data extent size of the data extents in the data area, and reconstructing the extents in the failed storage device with the selected first-type reserved extents having the smaller reserved extent size.

2. The method according to claim 1, wherein generating the reserved area comprises:
    determining a maximum size of the first-type reserved extent;
    determining a minimum quantity of the first-type reserved extents in a storage device of the plurality of storage devices; and
    selecting, based on the maximum size and the minimum quantity, at least one first-type reserved extent from the storage device for generating the reserved area.

3. The method according to claim 2, wherein determining the maximum size comprises:
    determining a maximum quantity of the plurality of storage devices corresponding to the redundant storage strategy; and
    determining the maximum size of the first-type reserved extent based on the maximum quantity and a capacity of the storage device.

4. The method according to claim 2, wherein determining the minimum quantity comprises:
    determining the minimum quantity based on a predetermined capacity of the reserved area and the maximum size of the first-type reserved extent.

5. The method according to claim 4, further comprising:
    dividing each of the plurality of storage devices into a set of second-type reserved extents,
    wherein generating the reserved area further comprises:
        generating the reserved area based on the set of second-type reserved extents respectively located in the plurality of storage devices, the set of second-type reserved extents being used for supporting an expansion operation in the storage system when the quantity of the plurality of storage devices changes.

6. The method according to claim 5, wherein generating the reserved area based on the set of second-type reserved extents comprises:
    determining, based on a minimum quantity of the plurality of storage devices corresponding to the storage strategy, the quantity of second-type reserved extents located in the storage devices.

7. The method according to claim 6, wherein the second-type reserved extents and the first-type reserved extents have the same smaller reserved extent size, wherein the generating of the reserved area further comprises:
    for the storage device, determining the quantity of reserved extents located in the storage device based on a sum of the minimum quantity of the first-type reserved extents and the quantity of the second-type reserved extents, and wherein the method further comprises:
  performing the expansion operation in the storage system, the performing of the expansion operation including adding a storage device to the plurality of storage devices, and, having added the storage device to the plurality of storage devices, determining whether a resulting quantity of the plurality of storage devices is greater than, equal to, or less than a RAID width of the storage system;
  if the resulting quantity of the plurality of storage devices is greater than or equal to the RAID width, constructing a RAID stripe that spans the plurality of storage devices while avoiding migrating data inside the storage system; and
  if the resulting quantity of the plurality of storage devices is less than the RAID width, constructing a RAID stripe that meets the RAID width by migrating data inside the storage system.

8. The method according to claim 2, wherein generating the data area comprises:
  determining a maximum value of the data extent size based on a multiple of the maximum size of the reserved extent; and
  based on a capacity of a storage device in the plurality of storage devices and the maximum value of the data extent size, determining a data extent quantity of data extents located in the storage device.

9. The method according to claim 8, wherein determining the data extent quantity of data extents located in the storage device further comprises:
  determining a predetermined condition associated with the data extent quantity based on a minimum quantity of the plurality of storage devices corresponding to the storage strategy; and
  determining the data extent quantity based on the capacity of the storage device in the plurality of storage devices, the maximum value, and the predetermined condition.

10. The method according to claim 9, wherein the predetermined condition comprises that:
  the data extent quantity is an integer multiple of the minimum quantity of the plurality of storage devices corresponding to the storage strategy.

11. An electronic device, including:
  at least one processor;
  a volatile memory; and
  a memory coupled to the at least one processor, wherein the memory has instructions stored therein which, when executed by the at least one processor, cause the device to perform actions for managing extents in a storage system that comprises a plurality of storage devices supporting a redundant storage strategy, and the actions comprise:
    dividing each of the plurality of storage devices into a set of first-type reserved extents and a set of data extents, the data extents having a data extent size;
    generating a reserved area of the storage system based at least on the set of first-type reserved extents respectively located in the plurality of storage devices, the set of first-type reserved extents being used for supporting a reconstruction operation for a failed storage device when the failed storage device appears in the plurality of storage devices;
    generating a data area of the storage system based on the set of data extents respectively located outside the reserved area in the plurality of storage devices, the data area being used for providing data storage for a user of the storage system; and
    performing the reconstruction operation for the failed storage device, the performing of the reconstruction operation including selecting the first-type reserved extents in the reserved area having a smaller reserved extent size than the data extent size of the data extents in the data area, and
    reconstructing the extents in the failed storage device with the selected first-type reserved extents having the smaller reserved extent size.

12. The device according to claim 11, wherein generating the reserved area comprises:
  determining a maximum size of the first-type reserved extent;
  determining a minimum quantity of the first-type reserved extents in a storage device of the plurality of storage devices; and
  determining, based on the maximum size and the minimum quantity, at least one first-type reserved extent from the storage device for generating the reserved area.

13. The device according to claim 12, wherein determining the maximum size comprises:
  determining a maximum quantity of the plurality of storage devices corresponding to the redundant storage strategy; and
  determining the maximum size of the first-type reserved extent based on the maximum quantity and a capacity of the storage device.

14. The device according to claim 12, wherein determining the minimum quantity comprises:
  determining the minimum quantity based on a predetermined capacity of the reserved area and the maximum size of the first-type reserved extent.

15. The device according to claim 14, wherein the actions further comprise:
  dividing each of the plurality of storage devices into a set of second-type reserved extents, and
  wherein generating the reserved area further comprises:
    generating the reserved area based on the set of second-type reserved extents respectively located in the plurality of storage devices, the set of second-type reserved extents being used for supporting an expansion operation in the storage system when the quantity of the plurality of storage devices changes.

16. The device according to claim 15, wherein generating the reserved area based on the set of second-type reserved extents comprises:
  determining, based on a minimum quantity of the plurality of storage devices corresponding to the storage strategy, the quantity of second-type reserved extents located in the storage devices.

17. The device according to claim 16, wherein the second-type reserved extents and the first-type reserved extents have the same smaller reserved extent size, wherein the generating of the reserved area further comprises:
  for the storage device, determining the quantity of reserved extents located in the storage device based on a sum of the minimum quantity of the first-type reserved extents and the quantity of the second-type reserved extents, and
  wherein the actions further comprise:
    performing the expansion operation in the storage system, the performing of the expansion operation including adding a storage device to the plurality of storage devices, and, having added the storage device to the plurality of storage devices, determining whether a resulting quantity of the plurality of storage devices is greater than, equal to, or less than a RAID width of the storage system;

if the resulting quantity of the plurality of storage devices is greater than or equal to the RAID width, constructing a RAID stripe that spans the plurality of storage devices while avoiding migrating data inside the storage system; and if the resulting quantity of the plurality of storage devices is less than the RAID width, constructing a RAID stripe that meets the RAID width by migrating data inside the storage system.

18. The device according to claim 12, wherein generating the data area comprises:

determining a maximum value of the data extent size based on a multiple of the maximum size of the reserved extent; and based on a capacity of a storage device in the plurality of storage devices and the maximum value of the data extent size, determining a data extent quantity of data extents located in the storage device.

19. The device according to claim 18, wherein determining the data extent quantity of data extents located in the storage device further comprises:

determining a predetermined condition associated with the data extent quantity based on a minimum quantity of the plurality of storage devices corresponding to the storage strategy, wherein the predetermined condition comprises that:

the data extent quantity is an integer multiple of the minimum quantity of the plurality of storage devices corresponding to the storage strategy; and determining the data extent quantity based on the capacity of the storage device in the plurality of storage devices, the maximum value, and the predetermined condition.

20. A computer program product having a non-transitory computer readable medium which stores a set of instructions to manage extents in a storage system which comprises a plurality of storage devices supporting a redundant storage strategy; the set of instructions, when carried out by computerized circuitry, causing the computerized circuitry to perform a method of:

dividing each of the plurality of storage devices into a set of first-type reserved extents and a set of data extents, the data extents having a data extent size;

generating a reserved area of the storage system based at least on the set of first-type reserved extents respectively located in the plurality of storage devices, the set of first-type reserved extents being supporting a reconstruction operation for a failed storage device when the failed storage device appears in the plurality of storage devices;

generating a data area of the storage system based on the set of data extents respectively located outside the reserved area in the plurality of storage devices, the data area providing data storage for a user of the storage system; and performing the reconstruction operation for the failed storage device, the performing of the reconstruction operation including selecting the first-type reserved extents in the reserved area having smaller reserved extent size than the data extent size of the data extents in the data area, and reconstructing the extents in the failed storage device with the selected first-type reserved extents having the smaller reserved extent size.

\* \* \* \* \*